United States Patent Office 2,866,780
Patented Dec. 30, 1958

2,866,780

PRODUCTION OF LOW ASH RESIN

George Oliver Hillard, Jr., Westfield, N. J., and Lawrence Wesley McLean, Baton Rouge, La., assignors to Esso Research and Engineering Company, a corporation of Delaware No Drawing. Application March 6, 1957
Serial No. 644,421

14 Claims. (Cl. 260—88.1)

This invention relates to high molecular weight resinous copolymers of low ash content prepared by low temperature Friedel-Crafts polymerization. The present invention further relates to improved methods of processing resinous copolymers of a major proportion of a vinyl aromatic compound and a minor proportion of a $C_4$ to $C_8$ isoolefin for product recovery so as to obtain products of low ash content. A representative type of copolymer to which the invention may be applied is one made by copolymerizing about 50 to 80 weight percent and preferably about 50 to 70 weight percent of styrene with the balance being isobutylene at a temperature level of between about $-10°$ and $-200°$ C. and preferably between about $-20°$ and $-150°$ C.

U. S. Patent No. 2,274,749 describes copolymers of the general type referred to above, i. e. copolymers of alpha or para methyl styrene, indene, dihydronaphtalene, dichlorostyrene, parachlorostyrene, or especially styrene with isobutylene, 2-methyl-1-butene, 3-methyl-1-butene, or the like, and methods of preparing the same. The patent indicates that by adjusting the proportions of the two raw materials, resinous copolymers of the desired hardness, melting point, plasticity, etc. may be obtained. Isoolefin-vinyl aromatic copolymers such as styrene-isobutylene copolymers having, for instance, a combined styrene content of about 50 to 70% by weight, and having a suitable combination of high tensile strength (e. g. 1,000 p. s. i. or higher) and tough thermoplastic characteristics, which permit them to be sheeted out into thin self supported films or extruded, molded, or otherwise shaped, have been made by the above described polymerization process.

In order to obtain high yields of resinous products, such copolymers of isoolefins with vinyl aromatic hydrocarbons are commercially produced in a diluent (which is a solvent for the copolymer formed) such as $C_1$ to $C_3$ alkyl halides having boiling points below that of water. When copolymerizing olefinic compounds containing an aromatic nucleus such as styrene with minor proportions of $C_4$ to $C_8$ isoolefins such as isobutylene, the copolymerization reaction product, which is produced in a reaction zone in the form of a solution in the alkyl halide diluent, is conventionally caused to flow into a flash drum where it may be washed with acid and/or water and/or contacted with steam and hot water to remove volatile materials and to slurry the copolymer in aqueous suspension. The copolymer is then conventionally recovered by filtration, degassing extrusion, and drying or the like. The copolymer as recovered has a Staudinger molecular weight of between about 2,000 and 1,000,000, preferably between about 5,000 and 500,000.

Although good yields of resinous copolymers have been obtained by the above general process, such copolymers have been found to have an undesirably high ash content which is disadvantageous in such applications as electrical insulation, films or fibers, etc.

In accordance with the present invention, resinous copolymers of low ash content are surprisingly obtained by adding a hydrocarbon solvent to the mixture prior to flashing off the alkyl halide solvent. Subsequent washing by dilute acid and/or water of the resin while dissolved in the hydrocarbon solvent results in a product of acceptable ash content. More particularly, the process of the present invention comprises contacting the low temperature copolymer dissolved in a $C_1$ to $C_3$ alkyl halide solvent at a higher temperature with a $C_5$ to $C_{10}$ hydrocarbon boiling above the boiling point of the solvent at conditions adapted to volatilize alkyl halide and dissolve copolymer in the hydrocarbon; (e. g. 20° to 200° C. and at about atmospheric pressure to about 200 p. s. i. g.). The resulting copolymer is then washed with a dilute acid and/or water while dissolved in the hydrocarbon solvent, at about 0° to 70° C. but normally at temperatures below the boiling point of the hydrocarbon solvent and at atmospheric pressure to about 50 p. s. i. g. to remove sufficient catalyst to produce a product having an ash content of below about 0.01 weight percent based on copolymer. The volume and temperature of the hydrocarbon solvent should be sufficient to volatilize alkyl halide and dissolve the copolymer in the hydrocarbon. The alkyl halide vapors are then condensed and then recycled in liquid form to the reactor. The resulting copolymer containing solution may then be washed with dilute acid and-or water and/or contacted with an aqueous medium boiling above the boiling point of the hydrocarbon solvent under conditions adapted to volatilize hydrocarbon, the hydrocarbon vapors formed being then condensed and recycled in liquid form to the flash zone.

For the purposes of the present invention, the alkyl halide solvent is preferably an unreactive $C_1$ to $C_3$ alkyl halide which is a solvent for the monomers, catalyst and copolymer at copolymerization conditions and which does not form a complex with the catalyst. Suitable diluents falling within the foregoing class of alkyl halides are: methyl chloride, methylene chloride, ethyl chloride, ethylene chloride, methyl fluoride, ethyl fluoride, ethylene fluoride, etc. The preferred alkyl halide is methyl chloride.

Suitable hydrocarbon solvents include $C_5$ to $C_{10}$, preferably $C_6$ to $C_8$ hydrocarbons such as normal or isoparaffins including hexane, heptane, octane, isohexane, isooctane; aromatic hydrocarbons such as benzene, toluene, and xylene; hydrocarbon fractions or hydrogenated hydrocarbon fractions such as naphthas, gasolines, mineral spirits or kerosenes; mixtures thereof, etc.

In order to more fully illustrate the present invention, the following experimental data are given.

Example

A copolymer of 60 weight percent of styrene and 40 weight percent of isobutylene was produced as a solution in 2 volumes of methyl chloride. The reactants were cooled to $-30°$ C. and blended with 10 grams of aluminum chloride dissolved in 200 grams of methyl chloride. Reaction was continued for 60 minutes and the resulting copolymer solution containing 1 kilogram of copolymer overflowed into a flash drum containing 2 kilograms of heptane as the hydrocarbon solvent. The methyl chloride was then driven off by heating the resulting mixture at a temperature level of 35–40° C. for 30 minutes. The resulting solution of copolymer dissolved in heptane was then washed with 1 volume of 3% aqueous hydrochloric acid at a temperature level of 18–20° C. The acid washed product was then water washed three times at a temperature level of 24–26° C.

A second run was made as a control in which no hydrocarbon was added during recovery and washing. Both products were then recovered by distillation and stripped for 5 minutes under 20 inches of vacuum. The products were compared for ash content, the results being as follows:

|  | Control | Run A |
|---|---|---|
| Hydrocarbon added | No | Yes |
| Ash content after acid and water wash | 0.18 | 0.0019 |

The above data show that washing a styrene-isobutylene resinous copolymer while dissolved in a hydrocarbon solvent, in accordance with the present invention, reduces the ash content of the copolymer to a satisfactory level of well below about 0.01 weight percent based on copolymer, whereas, the omission of the hydrocarbon solvent during such washing precludes the production of a low ash product.

Resort may be had to modifications and variations of the disclosed embodiments without departing from the spirit of the invention or the scope of the appended claims.

What is claimed is:

1. In a process for recovering polymeric materials prepared by low temperature Friedel-Crafts polymerization, the improvement which comprises contacting a solution of said material in an alkyl halide solvent having a boiling point below that of water with a hydrocarbon solvent with a boiling point higher than that of the alkyl halide solvent, removing alkyl halide by volatilization, and washing the polymeric material with an aqueous medium with a boiling point higher than that of the hydrocarbon solvent while dissolved in the hydrocarbon solvent.

2. A process according to claim 1 in which the polymeric material is a resinous copolymer of a major proportion of an olefinic compound containing an aromatic nucleus and a minor proportion of a $C_4$ to $C_8$ isoolefin.

3. A process according to claim 1 in which the alkyl halide is selected from the group consisting of $C_1$ to $C_3$ alkyl chlorides, $C_1$ to $C_3$ alkyl fluorides, and mixtures thereof.

4. A process according to claim 1 in which the hydrocarbon solvent comprises at least one $C_5$ to $C_{10}$ hydrocarbon.

5. A process according to claim 2 in which the copolymer comprises styrene and isobutylene.

6. A process according to claim 3 in which the alkyl halide solvent is methyl chloride.

7. In a process for continuously recovering resinous copolymers prepared by low temperature Friedel-Crafts polymerization, the improvement which comprises contacting a solution of said copolymer in an alkyl halide solvent having a boiling point below that of water with a hydrocarbon solvent with a boiling point higher than that of the alkyl halide solvent at a temperature above the halide solvent boiling point to volatilize alkyl halide, and washing the resulting resinous copolymer with an aqueous medium with a boiling point higher than that of the hydrocarbon solvent while dissolved in the hydrocarbon solvent.

8. A process according to claim 7 in which the resinous copolymer is a copolymer of about 50 to 80 weight percent of a vinyl aromatic compound and about 20 to 50 weight percent of a $C_4$ to $C_8$ isoolefin.

9. A process according to claim 7 in which the alkyl halide is selected from the group consisting of $C_1$ to $C_3$ alkyl chlorides, $C_1$ to $C_3$ alkyl fluorides and mixtures thereof.

10. A process according to claim 7 in which the hydrocarbon solvent comprises at least one $C_4$ to $C_8$ hydrocarbon.

11. A process according to claim 7 in which the resinous copolymer is a copolymer of about 50 to 70 weight percent styrene and about 30 to 50 weight percent of isobutylene.

12. A process according to claim 7 in which the alkyl halide is methyl chloride.

13. A process according to claim 7 in which the copolymer is washed with an acid.

14. A process according to claim 7 in which the copolymer is washed with water.

References Cited in the file of this patent

UNITED STATES PATENTS 2,274,749   Smyers _____ Mar. 3, 1942